(12) United States Patent
Nakamura et al.

(10) Patent No.: US 10,083,601 B2
(45) Date of Patent: Sep. 25, 2018

(54) REMOTE CONTROL DEVICE AND APPARATUS CONTROLLING SYSTEM

(71) Applicant: MINEBEA CO., LTD., Kitasaku-gun, Nagano (JP)

(72) Inventors: Yoshihiro Nakamura, Fukuroi (JP); Kohei Nishibori, Iwata (JP)

(73) Assignee: Minebea Co., Ltd., Nagano (JP)

( * ) Notice: Subject to any disclaimer, the term of this patent is extended or adjusted under 35 U.S.C. 154(b) by 71 days.

(21) Appl. No.: 15/226,634

(22) Filed: Aug. 2, 2016

(65) Prior Publication Data

US 2017/0038043 A1 Feb. 9, 2017

(30) Foreign Application Priority Data

Aug. 5, 2015 (JP) ................................ 2015-154862

(51) Int. Cl.
| | | |
|---|---|---|
| G06F 3/00 | (2006.01) | |
| G08C 17/02 | (2006.01) | |
| G06F 3/01 | (2006.01) | |
| G06F 3/044 | (2006.01) | |
| G06F 3/041 | (2006.01) | |
| H05B 37/02 | (2006.01) | |

(52) U.S. Cl.
CPC ............ G08C 17/02 (2013.01); G06F 3/017 (2013.01); G06F 3/044 (2013.01); G06F 3/0416 (2013.01); H05B 37/0227 (2013.01); G06F 2203/04108 (2013.01)

(58) Field of Classification Search
CPC ........ G06F 3/0416; G06F 3/044; G06F 3/017; G06F 2203/04108; G08C 17/02; H05B 37/0227
See application file for complete search history.

(56) References Cited

U.S. PATENT DOCUMENTS 8,615,108 B1 * 12/2013 Stoppa ................. G06K 9/4671
382/103
9,619,105 B1 * 4/2017 Dal Mutto .......... G06F 3/04815
(Continued)

FOREIGN PATENT DOCUMENTS

| JP | 2007-200207 A | 8/2007 |
|---|---|---|
| JP | 2007-200329 A | 8/2007 |

(Continued)

OTHER PUBLICATIONS

Office Action dated Apr. 18, 2017 in the corresponding Japanese Patent Application 2015-154862.
(Continued)

*Primary Examiner* — Muhammad N Edun
(74) *Attorney, Agent, or Firm* — Carrier Blackman & Associates, P.C.; Joseph P. Carrier; Jeffrey T. Gedeon

(57) ABSTRACT

A remote control device includes: a detector that detects a time-dependent change of a position of a recognition target object; a motion recognition unit that recognizes a gesture corresponding to the time-dependent change of the position of the recognition target object detected by the detector; a controller that generates a control signal based on the gesture recognized by the motion recognition unit; and a transmitter that transmits the control signal to an apparatus having a drivable portion to command a movement of the drivable portion.

7 Claims, 8 Drawing Sheets

(56) References Cited

U.S. PATENT DOCUMENTS

| | | | |
|---|---|---|---|
| 2007/0171273 A1 | 7/2007 | Saleh et al. | |
| 2011/0234746 A1 | 9/2011 | Saleh et al. | |
| 2013/0176505 A1 | 7/2013 | Lee et al. | |
| 2013/0342720 A1 | 12/2013 | Azami | |
| 2014/0043230 A1* | 2/2014 | Galor | G06F 3/005 |
| | | | 345/156 |
| 2014/0313122 A1 | 10/2014 | Tang et al. | |
| 2014/0313363 A1 | 10/2014 | Chiu et al. | |
| 2014/0343699 A1 | 11/2014 | Engelen et al. | |
| 2015/0054740 A1* | 2/2015 | Berestov | G06F 3/017 |
| | | | 345/157 |
| 2015/0077986 A1 | 3/2015 | Engelen et al. | |
| 2015/0193109 A1 | 7/2015 | Takahashi | |
| 2016/0063630 A1* | 3/2016 | Molloy | G06Q 40/06 |
| | | | 705/36 R |

FOREIGN PATENT DOCUMENTS

| | | |
|---|---|---|
| JP | 2013-143775 A | 7/2013 |
| JP | 2014-007653 A | 1/2014 |
| JP | 2014-099719 A | 5/2014 |
| JP | 2014-191780 A | 10/2014 |
| JP | 2014-211858 A | 11/2014 |
| JP | 2015-035103 A | 2/2015 |
| JP | 2015-505136 A | 2/2015 |
| JP | 2015-130015 A | 7/2015 |

OTHER PUBLICATIONS

Office Action dated Jul. 4, 2017 in the corresponding Japanese Patent Application 2015-154862.

* cited by examiner

FIG. 4

| MOTION OF MOVING LIGHT | GESTURE | POSITION OF DETECTION |
|---|---|---|
| INITIALIZATION | DOUBLE-TAP | CENTRAL PART 131 |
| ILLUMINATION-ON | TAP | UPPER END SURFACE 132 |
| ILLUMINATION-OFF | TAP | LOWER END SURFACE 133 |
| RAISE GRADATION OF MODULATED LIGHT BY ONE LEVEL | TAP | RIGHT END SURFACE 134 |
| LOWER GRADATION OF MODULATED LIGHT BY ONE LEVEL | TAP | LEFT END SURFACE 135 |
| MAXIMIZE MODULATED LIGHT | DOUBLE-TAP | RIGHT END SURFACE 134 |
| MINIMIZE MODULATED LIGHT | DOUBLE-TAP | LEFT END SURFACE 135 |
| PAN: ROTATION BY ONE LEVEL IN CW DIRECTION | FLICK | RIGHT END SURFACE 134 |
| PAN: ROTATION BY ONE LEVEL IN CCW DIRECTION | FLICK | LEFT END SURFACE 135 |
| TILT: MOVEMENT BY ONE LEVEL IN UPPER DIRECTION | FLICK | UPPER END SURFACE 132 |
| TILT: MOVEMENT BY ONE LEVEL IN LOWER DIRECTION | FLICK | LOWER END SURFACE 133 |
| ZOOM: APPROXIMATE FOCAL POINT BY ONE LEVEL | CW | CENTRAL PORTION 131 |
| ZOOM: ALIENATE FOCAL POINT BY ONE LEVEL | CCW | CENTRAL PORTION 131 |

A (brace covering the last six rows)

*FIG. 8A*

| DISTANCE OF RECOGNITION TARGET OBJECT | GESTURE |
|---|---|
| SHORT DISTANCE | FIRST GESTURE |
| MIDDLE DISTANCE | SECOND GESTURE |
| LONG DISTANCE | THIRD GESTURE |

*FIG. 8B*

| SPEED OF RECOGNITION TARGET OBJECT | GESTURE |
|---|---|
| HIGH | FIRST GESTURE |
| MEDIUM | SECOND GESTURE |
| LOW | THIRD GESTURE |

REMOTE CONTROL DEVICE AND APPARATUS CONTROLLING SYSTEM

BACKGROUND OF THE DISCLOSURE

1. Field of the Invention

The present invention relates to an apparatus controlling system which includes an apparatus having a drivable portion and a remote control device for remotely controlling the apparatus.

2. Description of the Related Art

An operation input device described in JP-A-2014-191780 is an example of an operation input device of an air blower which operates the air blower through a gesture input of an operator. In paragraph [0035] of JP-A-2014-191780, it is described that "the gesture input that moves the input operation body near the air outlet can be reliably detected without exception since the movement direction of the input operation body is detected from the capacitance value changing depending on the distance from the input operation body approaching a blast port without using a camera or an infrared sensor". In paragraph [0044], it is described that "the wind direction of the air blower can be operated through the intuitive gesture input which matches with an adjustment direction of a wind direction of the blast port operated by the operator".

In paragraphs [0073] and [0074] of JP-A-2014-191780, it is described that "the storage unit 21 further stores a pre-determined operation content that the car air-conditioner 50 is operated in association with the relative movement directions of the hand 30 detected by motion detector", and "when the relative movement direction of the hand 30 is detected, the MPU 10 reads the operation content stored in association with the movement direction from the storage unit 21, and outputs the operation signal generated from the operation content, . . . , to a control target".

However, there is a problem that an operability is deteriorated in a case where the adjustment of a direction and a position such as an illumination direction or a focal length of a moving light is independently remote-controlled.

For example, in a case where the adjustment of the direction and the position is performed, it is necessary to perform a fine adjustment control in a motion control, and it is difficult to perform the fine adjustment, which is desired by the operator, on a variable device without the fine adjustment control. In addition, only with the fine adjustment control, the repetitive operation is necessarily performed many times in a case where a portion is desired to move largely, and thus the operation becomes complicated. Further, when gestures associated with the fine adjustment control and the rough adjustment control are not similar with each other, the operator cannot perform an intuitive gesture. Generally, the gesture is not generated from a language, but generated from a body motion or a hand motion expressed as the motion of the body. In this specification, an operation such as a touch, a tap, a flick, and a rotation on a panel such as the capacitance sensor is widely referred to as the gesture.

SUMMARY OF THE INVENTION

One of objects of the present invention is to provide an apparatus controlling system in which the operability of a remote control device is improved and thus the apparatus can be easily adjusted.

According to an illustrative embodiment of the present invention, there is provided a remote control device including: a detector that detects a time-dependent change of a position of a recognition target object; a motion recognition unit that recognizes a gesture corresponding to the time-dependent change of the position of the recognition target object detected by the detector; a controller that generates a control signal based on the gesture recognized by the motion recognition unit; and a transmitter that transmits the control signal to an apparatus having a drivable portion to command a movement of the drivable portion.

According to another illustrative embodiment of the present invention, there is provided an apparatus controlling system including: an apparatus having a drivable portion; and a remote controller for controlling a movement of the drivable portion, wherein the remote controller includes: a detector that detects a time-dependent change of a position of a recognition target object; a motion recognition unit that recognizes a gesture corresponding to the time-dependent change of the position of the recognition target object detected by the detector; a controller that generates a control signal based on the gesture recognized by the motion recognition unit; and a transmitter that transmits the control signal to the apparatus to command the movement of the drivable portion.

BRIEF DESCRIPTION OF THE DRAWINGS

In the accompanying drawings:

FIG. 4 is a diagram illustrating a relation between a gesture corresponding to the detection area of the capacitance sensor in FIG. 3 and a motion of the moving light corresponding to the gesture using a correspondence table;

FIGS. 8A and 8B are diagrams illustrating a relation between a capacitance sensor of a modification example of the remote control device of the apparatus controlling system according to the present embodiment, and the gesture corresponding to the capacitance sensor using the correspondence table.

DETAILED DESCRIPTION

Hereinafter, an embodiment of the invention will be described in detail with reference to the accompanying drawings.

Figure 1:
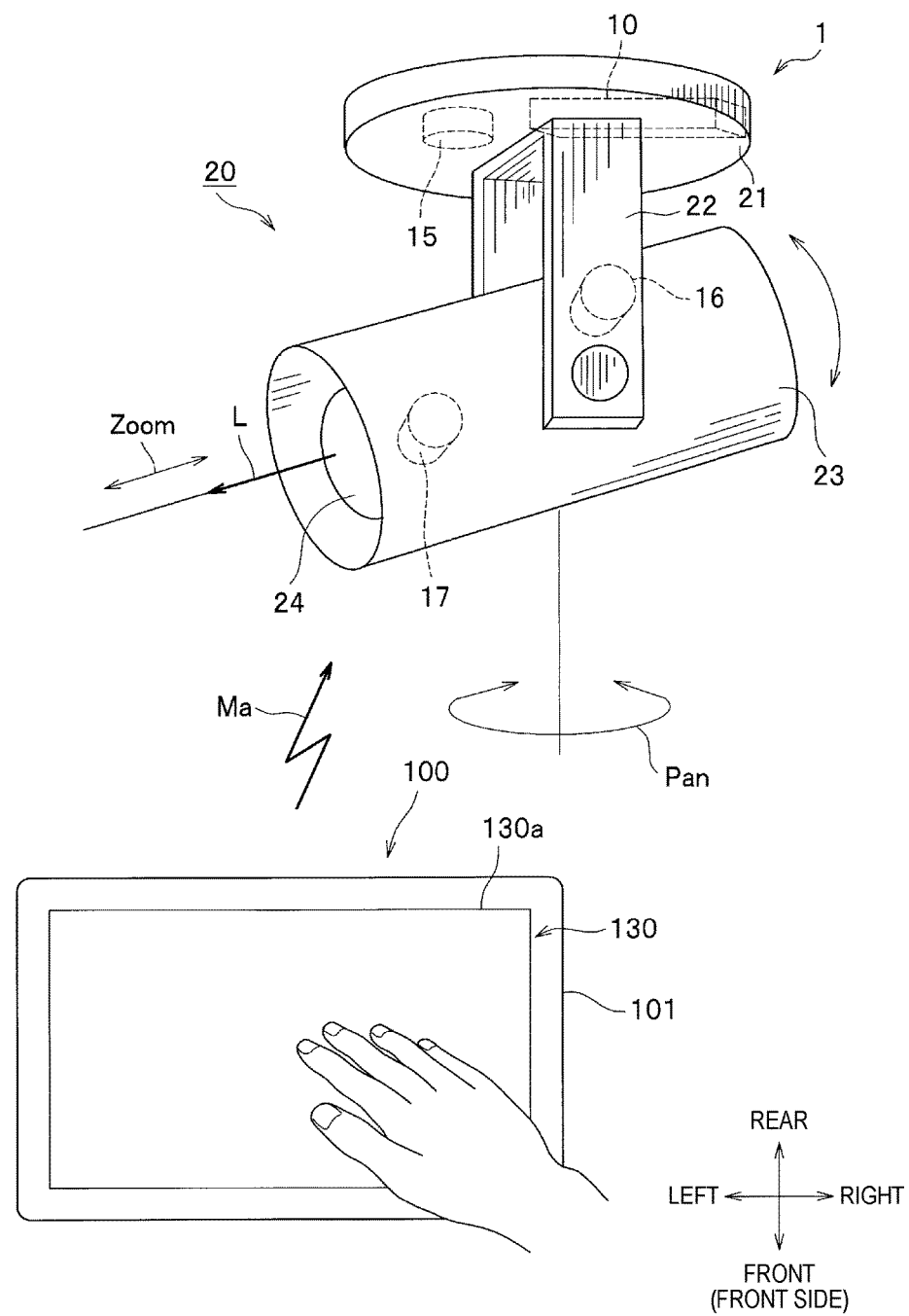
FIG. 1 is a perspective view illustrating an apparatus controlling system according to an embodiment of the present invention.

FIG. 1 is a perspective view illustrating an apparatus controlling system 1 according to an embodiment of the present invention The apparatus controlling system 1 (variable illuminator) includes a moving light 20 (an apparatus having a drivable portion), and a remote control device 100 which performs remote control on the moving light as illustrated in FIG. 1. The moving light 20 includes a horizontal rotary unit 21, an arm 22 fixed on the lower side of the horizontal rotary unit 21, and a hood 23 held by the arm 22.

The horizontal rotary unit 21 of the moving light 20 includes a pan motor 15 and a variable control unit 10. The horizontal rotary unit 21 is connected to the fixed portion of a ceiling, and is configured to be horizontally rotatable by the pan motor 15. In addition, the horizontal rotary unit 21 holds the arm 22, and can horizontally pan an illumination direction of a lighting equipment 24 by the rotation of the pan motor 15.

The hood 23 is held by the arm 22, and is configured to vertically rotatable by a tilt motor 16 attached to the arm 22. The illumination direction of the lighting equipment 24 can be vertically tilted by the rotation of the tilt motor 16.

The hood 23 stores the lighting equipment 24 thereinside, and is configured to be capable of adjusting a focal length of the lighting equipment 24 with a focus motor 17 and a lens (not illustrated).

The remote control device 100 is provided with the capacitance sensor 130 (see FIG. 2) on the upper surface of a casing 101. In a normal use, an operator supports the back surface of the casing 101 with a palm of one hand of a user, and operates the capacitance sensor 130 on the upper surface of the casing 101 with a recognition target object such as the other hand.

The remote control device 100 transmits a control signal to an apparatus having the drivable portion to command a movement of the portion. The remote control device 100 generates, for example, a communication signal Ma to rotationally drive the lighting equipment 24, and transmits the generated communication signal Ma to the variable control unit 10 of the moving light 20 through Bluetooth (registered trademark).

Two-way communication is performed between the moving light 20 of the present embodiment and the remote control device 100. Such a communication method is a RF (Radio Frequency) communication method represented by ZigBee (registered trademark), WiFi (registered trademark), Bluetooth (registered trademark), and the like. Incidentally, the communication method is a specific example, and is not limited thereto. In addition, both a wire and a wireless can be adopted as a communication type.

Figure 2:
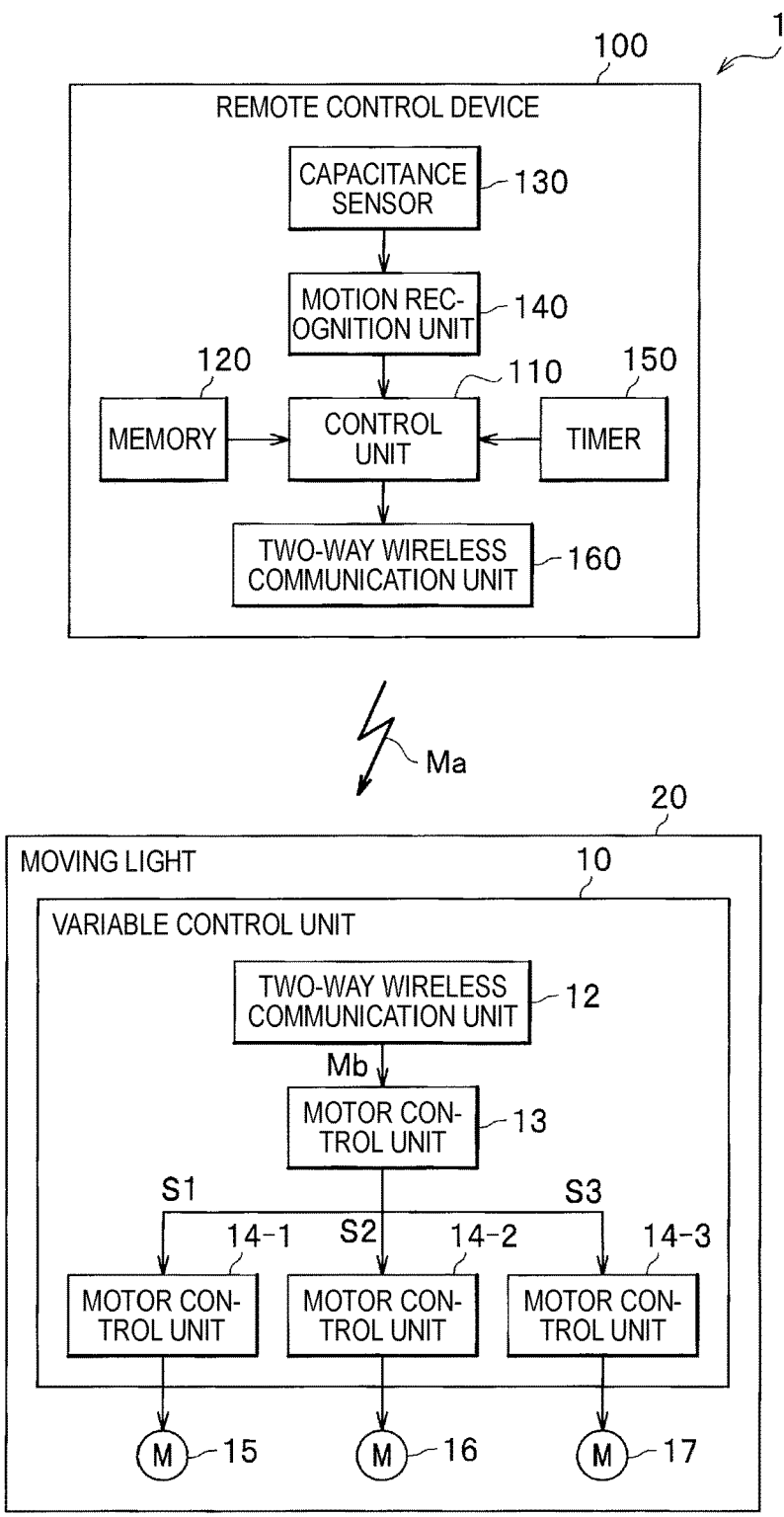
FIG. 2 is a block diagram illustrating a remote control device and a moving light configuring the apparatus controlling system according to the present embodiment.

FIG. 2 is a block diagram illustrating the remote control device 100 and the moving light 20 that constitutes the apparatus controlling system 1.

The remote control device 100 transmits a control signal to an apparatus having the drivable portion to command the movement of the portion.

The remote control device 100 includes a control unit 110 (controller), a memory 120, the capacitance sensor 130 (detector), a motion recognition unit 140 (motion recognition unit), a timer 150, and a two-way wireless communication unit 160 (transmitter).

The control unit 110 (one example of controller) controls all units of the remote control device 100, and the control is realized, for example, in such a manner that a CPU (Central Processing Unit) executes a control program.

The control unit 110 generates a control signal based on a recognized gesture such that the moving light 20 moves the portion by the predetermined movement amount in a preset direction ("fine adjustment control").

The control unit 110 generates a control signal such that the moving light 20 moves the portion to a maximum movable range of the moving light 20 in the preset direction when the same gesture is recognized again within a predetermined time after the recognition of the gesture ("rough adjustment control").

The control unit 110 generates a control signal to stop the portion to the moving light 20 when the same gesture or a predetermined gesture is recognized again after the control signal to move the moving light 20 to the maximum movable range is generated ("rough adjustment control: stop").

The memory 120 includes a ROM and a RAM storing a program for various processes, an EEPROM as a nonvolatile memory which is electrically rewritable, and the like. The memory 120 is used to store a program by the CPU performing control on the entire device, and to execute an information process. In addition, unique terminal information of a terminal such as a terminal number or a terminal name is stored in the nonvolatile memory. The memory 120 includes an external memory such as a USB (Universal Serial Bus) memory.

The capacitance sensor 130 is configured such that a position input device is stacked on a substrate, and is an electronic component which can receive an operation input by touching the surface in a non-contact or contact manner with the recognition target object (a hand of a user and the like). Incidentally, a component called a touch panel is formed on a liquid crystal panel.

The capacitance sensor 130 detects a time-dependent change of the position of the recognition target object (a tap, a flick, a rotation, and the like). Incidentally, the position of the recognition target object may be detected in a non-contact manner, and the invention is not limited to the capacitance sensor. A non-contact position sensor is exemplified by an inductive proximity sensor detecting a magnetic loss through an eddy current generated on the conductor surface, or a magnetic sensor using magnetic fields in two directions. In addition, a contact position sensor may be used.

The motion recognition unit 140 recognizes the gesture corresponding to the detected time-dependent change of the position of the recognition target object, and transmits a control command to the control unit 110. Then, the control unit 110 generates a control signal based on the gesture.

The timer 150 starts clocking (timer start) immediately after the transmission of the control command issued after the recognition of the gesture, and clocks a predetermined time (for example, 3 to 5 [s]).

The two-way wireless communication unit 160 transmits and receives the control signal and the like with the moving light 20 through a wireless communication circuit. The two-way wireless communication unit 160 is a two-way communication unit such as Bluetooth (registered trademark), transmits the generated control signal to the moving light 20 (apparatus), and receives a response signal such as a stop position of a portion from the moving light 20.

The moving light 20 includes the pan motor 15, the tilt motor 16, the focus motor 17, and the variable control unit 10 controlling them. The variable control unit 10 includes a two-way wireless communication unit 12 which receives the communication signal Ma output from the remote control device 100, a motor control unit 13 controlling a motor, and motor drive circuits 14-1 to 14-3. The variable control unit 10 variably controls each rotation speed of the pan motor 15, the tilt motor 16, and the focus motor 17. Hereinafter, the pan motor 15, the tilt motor 16, and the focus motor 17 are described simply as motors 15 to 17 unless distinguishing each individually.

The two-way wireless communication unit 12 receives the communication signal Ma output from the remote control device 100, decodes the subject communication signal Ma, and outputs a received signal Mb. The two-way wireless communication unit 12 extracts an on signal or an off signal, direction information (pan, tilt, and zoom), and the rotation direction of the motor from the communication signal Ma, and then outputs the signals to the motor control unit 13. The two-way wireless communication unit 12 further transmits an OK signal to the remote control device 100 after completion of the command of the communication signal Ma.

The motor control unit 13 generates command signals S1 to S3 to control the rotation speed of any one of the motor 15 to 17 based on the received signal Mb. Hereinafter, the command signals S1 to S3 are described simply as a command signal S unless distinguishing each individually. The command signal S which the motor control unit 13 output to the motor drive circuit 14 includes the command on the rotation direction of the motor. For example, if the command signal S is negative, the rotation direction of the motor is reversed.

The motor drive circuit 14-1 drives the pan motor 15 at the rotation speed corresponding to the command signal S1. The pan motor 15 horizontally adjusts the illumination direction of the lighting equipment 24.

The motor drive circuit 14-2 drives the tilt motor 16 at the rotation speed corresponding to the command signal S2. The tilt motor 16 vertically adjusts the illumination direction of the lighting equipment 24.

The motor drive circuit 14-3 drives the focus motor 17 at the rotation speed corresponding to the command signal S3. The focus motor 17 adjusts the focal length of the lighting equipment 24 back and forth.

Figure 3:
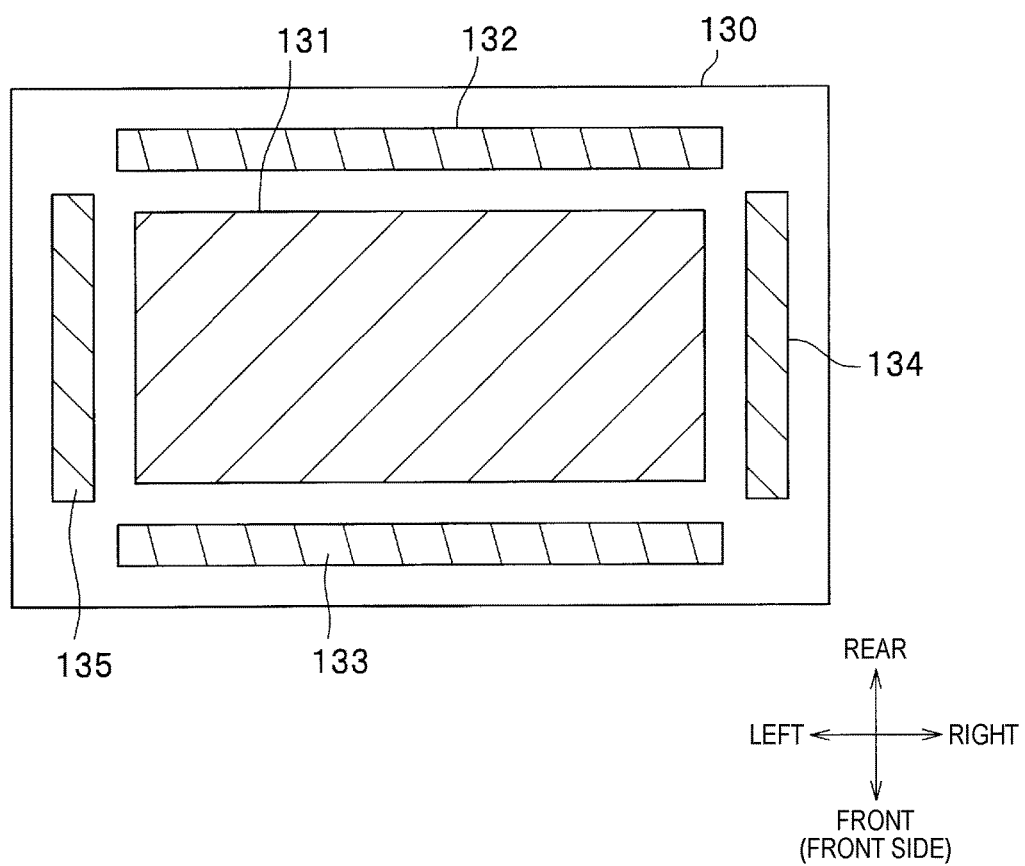
FIG. 3 is a diagram illustrating a detection area of the capacitance sensor of the remote control device of the apparatus controlling system according to the present embodiment.

FIG. 3 is a diagram illustrating a detection area of the capacitance sensor 130 of the remote control device 100.

As illustrated in FIG. 3, the capacitance sensor 130 has the detection area of a rectangular shape in which a right/left width is longer than a front/rear width in a front view.

As illustrated in a hatching portion of FIG. 3, the capacitance sensor 130 has the detection area including a rectangular central portion 131, an upper end surface 132 which is formed along the long side in the upper portion of the rectangular central portion 131, a lower end surface 133 which is formed along the long side in the lower portion of the rectangular central portion 131, a right end surface 134 which is formed along the short side in the right portion of the rectangular central portion 131, and a left end surface 135 which is formed along the short side in the left portion of the rectangular central part 131. In addition, as illustrated in the white color portion of FIG. 3, a sensor insensitive band (guard interval) is formed between the detection areas. The sensor insensitive band is set to clearly distinguish the operations to the detection areas, thereby preventing an erroneous operation. However, the sensor insensitive band may be narrow, and may be not provided. Incidentally, a color or message indicating an operation position or a content may be printed or colored on the detection areas.

FIG. 4 is a diagram illustrating a relation between a gesture corresponding to the detection area of the capacitance sensor 130 in FIG. 3 and a motion of the moving light 20 corresponding to the gesture using a correspondence table.

As illustrated in FIG. 4, the motion of the moving light 20 is an "initialization" when the central part 131 of the capacitance sensor 130 is double-tapped. Incidentally, the initialization indicates that the position of the moving light 20 returns to a zero point. A motion of "illumination-on" is performed on the moving light 20 when the upper end surface 132 of the capacitance sensor 130 is tapped, and a motion of an "illumination-off" of the moving light 20 is performed when the lower end surface 133 is tapped. In addition, a motion that "the gradation of modulated light is raised by one level" is performed on the moving light 20 when the right end surface 134 is tapped, and a motion that "the gradation of modulated light is lowered by one level" is performed on the moving light 20 when the left end surface 135 is tapped. In addition, a motion of "maximizing the modulated light" is performed on the moving light 20 when the right end surface 134 is double-tapped, and a motion of "minimizing the modulated light" is performed on the moving light 20 when the left end surface 135 is double-tapped. Incidentally, the tap indicates a gesture that a target detection area is touched in a contact manner with the recognition target object (a hand of a user and the like), and then quickly, the recognition target object moves away from the detection area. In addition, the double tap indicates a gesture that the tap is quickly repeated twice.

A pan motion of "a rotation by one level in a CW direction (clockwise rotation direction)" is performed on the moving light 20 when the right end surface 134 of the capacitance sensor 130 is flicked, and a pan motion of "a rotation by one level in a CCW direction (counterclockwise rotation direction)" is performed on the moving light 20 when the left end surface 135 is flicked. In addition, a tilt motion of "a movement by one level in an upper direction" is performed on the moving light 20 when the upper end surface 132 is flicked, and a tilt motion of "a movement by one level in a lower direction" is performed on the moving light 20 when the lower end surface 133 is flicked. Further, a zoom motion of "approximating the focal point by one level" is performed on a zoom of the moving light 20 when an operation is performed on the central part 131 in the CW direction (clockwise rotation direction), and a zoom motion of "alienating the focal point by one level" is performed on the moving light 20 when an operation is performed on the central part 131 in the CCW direction (counterclockwise rotation direction). Incidentally, the flick indicates a gesture that the recognition target object is quickly moved once from one place to another place in a non-contact or contact manner in the upper portion of the target detection area. The CW direction (clockwise rotation direction) indicates a gesture that the recognition target object is rotatably moved in a clockwise rotation direction in a non-contact or contact manner in the upper portion of the target detection area. In addition, the CCW direction (counterclockwise rotation direction) indicates a gesture that the recognition target object is rotatably moved in an opposite direction to the CW direction.

Herein, as denoted by a mark A in FIG. 4 in the motion of the moving light 20 in the correspondence table of FIG. 4, the "rough adjustment control" that the motion of the pan, the tilt, or the zoom is continuously performed to the last is executed in a case where the gesture is repeated twice within a predetermined time. Further, a "rough adjustment control stop" of stopping the rough adjustment control is executed in a case where the subject gesture is performed once more during the continuous motion. Incidentally, a detailed example of the "rough adjustment control" and the "rough adjustment control stop" will be described below.

The tilt motor 16 (see FIG. 2) is positively rotated to move the moving light 20 in the upper direction when the operator flicks the upper end surface 132 of the capacitance sensor 130 with the recognition target object (the hand of the user and the like). In addition, the tilt motor 16 is reversely rotated to move the moving light 20 in the lower direction when flicking the lower end surface 133 with the recognition target object. The illumination direction is tilted in this manner.

Similarly, the pan motor 15 is positively rotated to move the moving light 20 in a right direction when the operator flicks the right end surface 134 of the capacitance sensor 130 with the recognition target object. In addition, the pan motor 15 is reversely rotated to move the moving light 20 in a left direction when flicking the left end surface 135 with the recognition target object. The illumination direction is panned in this manner.

The focus motor 17 is positively rotated to move the focal length of the moving light 20 in a remote direction when the operator performs the operation in the CW direction (clockwise rotation direction) on the central part 131 of the capacitance sensor 130. In addition, the focus motor 17 is reversely rotated to move the focal length of the moving light 20 in an approaching direction when performing the operation in the CCW direction (counterclockwise rotation direction) on the central part 131. The focal length (Zoom) of the moving light 20 is moved in this manner.

That is, when the position of the recognition target object on each detection area of the capacitance sensor 130 is changed over time, the motor corresponding to the movement direction is rotated by a predetermined amount, and the illumination direction of the moving light 20 is panned and tilted by a predetermined movement amount, or the focal length (Zoom) is moved by a predetermined movement amount.

The present embodiment describes an example of adjusting (controlling) the state of the pan/tilt/zoom, and the gradation of modulated light of the moving light 20, but the state of any one of the pan/tilt/zoom, and the gradation of modulated light may be adjusted (controlled). A broadcasting apparatus such as a monitoring camera and a broadcasting camera may be subject to the adjustment (control) of the state of the pan/tilt/zoom and the like. A projection apparatus represented by a liquid crystal projector, DLP projector (registered trademark), or the like may be subject to the adjustment (control) of the state of a focus, a projection angle, or like of a screen through a motor. Further, a direction which a television faces may be adjusted horizontally, a wind direction of an air conditioner or an electric fan may be vertically and horizontally adjusted, and a vertical position, a horizontal position, or an angle of an electric window, an electric blind, or an electric curtain may be adjusted.

Hereinafter, the motion of the apparatus controlling system 1 configured as described above will be described.

Figure 5:
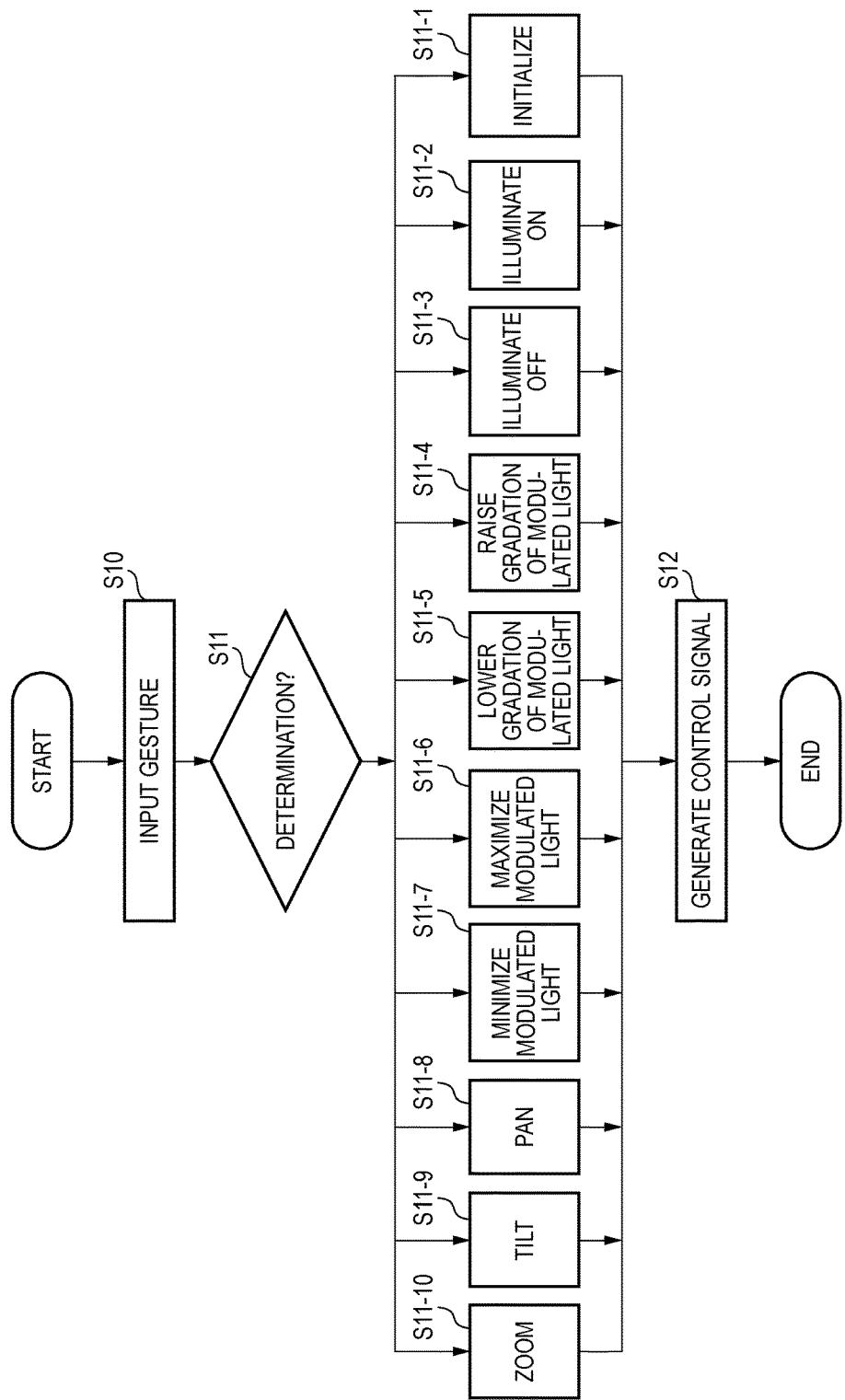
FIG. 5 is a flowchart illustrating a determination process on the gesture of the remote control device of the apparatus controlling system in the present embodiment.

FIG. 5 is a flowchart illustrating a determination process on the gesture of the remote control device 100. This flow is repeatedly executed by the control unit 110 (see FIG. 2) of the remote control device 100 at a predetermined timing.

The control unit 110 of the remote control device 100 starts the determination process on gestures as illustrated in FIG. 5 after a power source of a main body is turned on.

The capacitance sensor 130 (see FIG. 2) detects a gesture input of the operator from the time-dependent change (tap, flick, rotation and the like) of the position of the recognition target object (the hand of the user and the like) (Step S10).

When the gesture input is detected, the motion recognition unit 140 (see FIG. 2) recognizes a gesture corresponding to the detected time-dependent change of the position of the recognition target object, and determines the gesture (Step S11).

The detailed content of determination on the gesture will be described below.

When it is detected that the central part 131 of the capacitance sensor 130 is double-tapped, the motion recognition unit 140 determines that the gesture is intended to initialize the motion of the moving light 20 (Step S11-1).

When it is detected that the upper end surface 132 of the capacitance sensor 130 is tapped, the motion recognition unit 140 determines that the gesture is intended to perform the illumination-on on the moving light 20 (Step S11-2).

When it is detected that the lower end surface 133 of the capacitance sensor 130 is tapped, the motion recognition unit 140 determines that the gesture is intended to perform the illumination-off on the moving light 20 (Step S11-3).

When it is detected that the right end surface 134 of the capacitance sensor 130 is tapped, the motion recognition unit 140 determines that the gesture is intended to raise the gradation of the modulated light of the moving light 20 by one level (Step S11-4).

When it is detected that the left end surface 135 of the capacitance sensor 130 is tapped, the motion recognition unit 140 determines that the gesture is intended to lower the gradation of the modulated light of the moving light 20 by one level (Step S11-5).

When it is detected that the right end surface 134 of the capacitance sensor 130 is double-tapped, the motion recognition unit 140 determines that the gesture is intended to maximize the modulated light of the moving light 20 (Step S11-6).

When it is detected that the left end surface 135 of the capacitance sensor 130 is double-tapped, the motion recognition unit 140 determines that the gesture is intended to minimize the modulated light of the moving light 20 (Step S11-7).

When it is detected that the right end surface 134 of the capacitance sensor 130 is flicked, the motion recognition unit 140 determines that the gesture is intended to rotate the moving light 20 in the CW direction (clockwise rotation direction) by one level, and when it is detected that the left end surface 135 is flicked, the motion recognition unit 140 determines that the gesture is a pan gesture of rotating the moving light 20 in the CCW direction (counterclockwise rotation direction) by one level (Step S11-8).

When it is detected that the upper end surface 132 of the capacitance sensor 130 is flicked, the motion recognition unit 140 determines that the gesture is intended to move the moving light 20 in the upper direction by one level, and when it is detected that the lower end surface 133 is flicked, the motion recognition unit 140 determines that the gesture is a tilt gesture of moving the moving light 20 in the lower direction by one level (Step S11-9).

When it is detected that an operation is performed on the central part 131 of the capacitance sensor 130 in the CW direction (clockwise rotation direction), the motion recognition unit 140 determines that the gesture is intended to approach the focal point of the moving light 20 by one level, and when it is detected that an operation is performed on the central part 131 in the CCW direction (counterclockwise rotation direction), the motion recognition unit 140 determines that the gesture is a zoom gesture of alienating the focal point of the moving light 20 by one level (Step S11-10).

The control unit 110 generates the control signal to end the process of FIG. 5 based on the result of the above-described determination on the gesture (Step S12).

Figure 6:
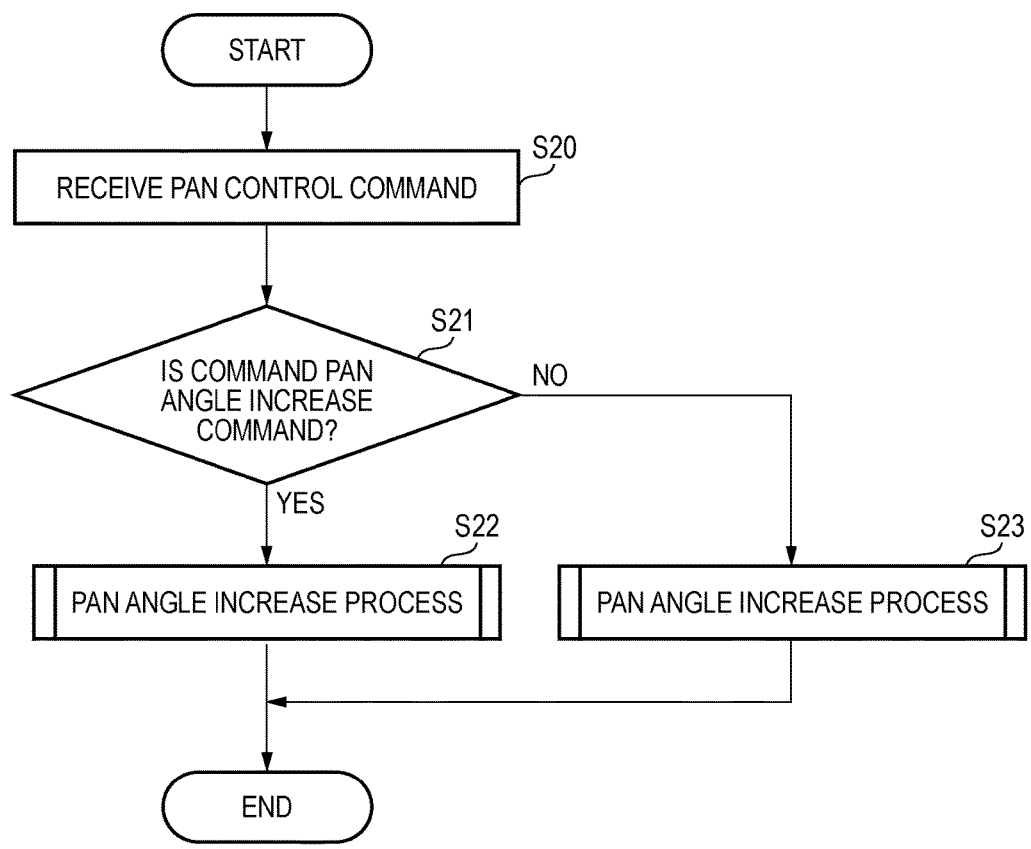
FIG. 6 is a flowchart illustrating a PAN control process of the remote control device of the apparatus controlling system according to the present embodiment.

FIG. 6 is a flowchart illustrating a PAN control process. Herein, an example of a PAN motion in the case of determining the pan gesture (Step S11-8 of FIG. 5) will be described.

The operator flicks the right end surface 134 or the left end surface 135 of the remote control device 100 in a case where the operator wants to perform the PAN motion on the illumination of the moving light 20. Specifically, the operator flicks the right end surface 134 of the remote control device 100 in a case where the operator wants to rotate the moving light 20 in the CW direction (clockwise rotation direction) by one level, and the operator flicks the left end surface 135 in a case where the operator wants to rotate the moving light 20 in the CCW direction (counterclockwise rotation direction) by one level. In this manner, the control unit 110 of the remote control device 100 executes the process of FIG. 5, and determines the PAN control based on the determination of the gesture recognition of Step S11 of FIG. 5 (Step S11-8 of FIG. 5).

The control unit 110 receives the PAN control command in Step S20, and the control unit 110 determines in Step S21 whether the received PAN control command is a PAN angle increase command or a PAN angle decrease command.

When the PAN control command is a PAN angle increase command (Step S21→Yes), a PAN angle increase process (see the detailed flow of the PAN angle increase process in FIG. 7) of Step S22 is executed to end the process of FIG. 6.

When the PAN control command is a PAN angle decrease command in Step S21 (Step S21→No), a PAN angle decrease process (not illustrated) of Step S23 is executed to end the process of FIG. 6.

Hereinafter, the description will be given about an example of the PAN angle increase process in which the operator rotates the illumination direction of the moving light 20 in the CW direction (clockwise rotation direction) by one level.

Figure 7:
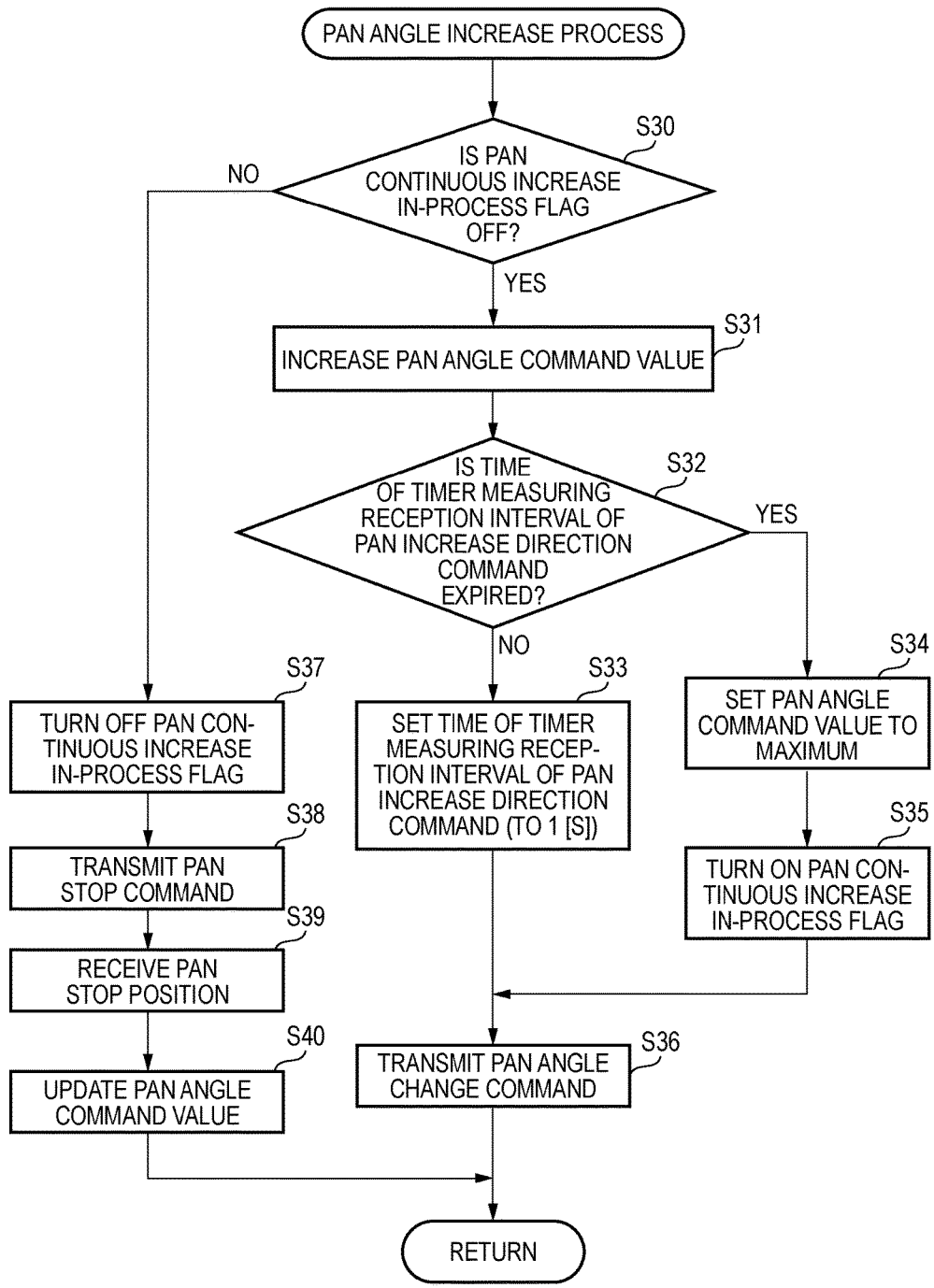
FIG. 7 is a flowchart illustrating a PAN angle increase process of the remote control device of the apparatus controlling system according to the present embodiment.

FIG. 7 is a flowchart illustrating the PAN angle increase process. The process starts by a subroutine call of Step S22 of FIG. 6.

In Step S30, the control unit 110 determines whether a PAN continuous increase in-process flag is OFF or not.

When the PAN continuous increase in-process flag is OFF (Step S30→Yes), a PAN angle command value is increased in Step S31.

Next, in Step S32, the control unit 110 determines whether the time of the timer measuring a reception interval of the PAN increase direction command is expired or not. When the timer 150 (see FIG. 2) clocks a reception interval of the PAN increase direction command, the control unit 110 can recognize the same gesture (herein, pan gesture) again within a predetermined time, or determine whether to stop based on a predetermined gesture.

When the time of the timer measuring the reception interval of the PAN increase direction command is not expired (Step S32→No), the control unit 110 determines that the predetermined time is not expired, the time of the timer measuring the reception interval of the PAN increase direction command is set, for example, to 1 [s] in Step S33, and the procedure proceeds to Step S36.

On the other hand, when the time of the timer measuring the reception interval of the PAN increase direction command is not expired in Step S32 (Step S32→Yes), the control unit 110 sets the PAN angle command value to the maximum in Step S34. That is, the operator shifts to Yes process of Step S32 in a case where the same gesture (herein, pan gesture) is repeated within the predetermined time. Such a case is considered that the operator wants to perform the PAN operation more quickly, and thus the rough adjustment control to move the PAN angle to the maximum movable range to the moving light 20 is performed.

Next, in Step S35, the control unit 110 turns on the PAN continuous increase in-process flag (set the flag), and the procedure proceeds to Step S36.

In Step S36, the control unit 110 causes the two-way wireless communication unit 160 to transmit a PAN angle change command to the moving light 20, and the procedure returns to Step S22 of FIG. 6. The PAN angle change command will be described. In the present embodiment, the PAN angle change command includes a control signal of the "fine adjustment control" that the moving light 20 is rotated in the CW direction (clockwise rotation direction) by one level based on the pan gesture (by no way of Step S34 of FIG. 7), and a control signal of the "rough adjustment control" of moving the moving light 20 to the maximum movable range (by way of Step S34 of FIG. 7) when the same pan gesture is recognized again within the predetermined time after the recognition of the pan gesture. In Step S36, such a PAN angle change command of the "fine adjustment control" or the "rough adjustment control" is transmitted.

On the other hand, when the PAN continuous increase in-process flag is turned ON in Step S30 (Step S30→No), the control unit 110 turns off the PAN continuous increase in-process flag in Step S37. That is, turning on the PAN continuous increase in-process flag in Step S30 corresponds to a case in which the same gesture or the predetermined gesture is recognized again while the control signal to move the moving light 20 to the maximum movable range is generated. As above, when the same gesture or the predetermined gesture is recognized again while the control signal to move the moving light 20 to the maximum movable range is generated, a control signal of the "rough adjustment control stop" of stopping the portion is generated to the moving light 20.

Next, in Step S38, the control unit 110 transmits the generated PAN stop command to the moving light 20.

Next, in Step S39, the two-way wireless communication unit 160 of the control unit 110 receives a PAN stop position of the moving light 20 from the moving light 20. The remote control device 100 includes the two-way wireless communication unit 160, and the two-way wireless communication enables the remote control device to transmit the PAN angle change command and the PAN stop command to the moving light 20 and receive the PAN stop position signal from the moving light 20. The control unit 110 can determine a correct PAN stop position of the moving light 20 based on the received PAN stop position signal.

Next, in Step S40, the control unit 110 updates the PAN angle command value based on the received PAN stop position signal, and ends the subroutine call of FIG. 7, and the procedure returns to Step S22 in FIG. 6.

The moving light 20 is operated by the remote control device 100 by executing the above processes.

The description has been given about an example in which the operator performs the PAN motion to rotate the illumination direction of the moving light 20 in the right direction.

The operator supports the back surface of the casing 101 (see FIG. 1) with the palm of one hand, and operates the capacitance sensor 130 of the upper surface of the casing 101 with the recognition target object such as the other hand and the like. First, the operator turns on the power source of the main body by tapping the upper end surface 132 of the capacitance sensor 130 of the remote control device 100 (see FIG. 1, the same applies hereafter). At this time, in a case where a certain process is in progress (for example, a previous control does not accurately end), it is preferable to reset the motion of the remote control device 100 by double-tapping the central part 131 of the capacitance sensor 130 at the moment.

The upper end surface 132 of the capacitance sensor 130 of the remote control device 100 is tapped so that the remote control device 100 starts up. The operator flicks the right end surface 134 of the capacitance sensor 130. The flicking of the operator causes the moving light 20 to rotate in the CW direction (clockwise rotation direction) by one level. The operator can flick the right end surface 134 to finely adjust the PAN angle of the moving light 20.

In a case where the operator wants to largely adjust the PAN angle of the moving light 20, the operator flicks the right end surface 134 as described above, and then immediately (for example, within 2 [s]), performs the same gesture as the previous gesture (herein, the flick to the right end surface 134). Accordingly, the control unit 110 performs the rough adjustment control to move the PAN angle of the moving light 20 to the maximum movable range. The rough adjustment control causes the PAN angle of the moving light 20 to move to the maximum movable range at one control. The operator can perform the rough adjustment on the PAN angle of the moving light 20 simply by flicking the right end surface 134 twice in a row. In the conventional example, it is necessary to repeat the operation of the fine adjustment control many times in a case where the operator wants to largely move a portion. However, in the present embodiment, the rough adjustment control can be performed through an intuitive operation that the same gesture is performed twice in a row.

In a case where the operator wants to stop the PAN angle at a certain rotation angle while the PAN angle moves to the maximum movable range, the same gesture (herein, the flick to the right end surface 134) is performed again, or a predetermined gesture (for example, the flick to the left end surface 135 which can visualize the stoppage and is designated as the reverse rotation, or the tap to large central part 131 of the detection area) is performed without performing the same gesture. In this manner, the control unit 110 executes a stop of the rough adjustment control which makes the PAN angle of the moving light 20 move to the maximum movable range. The PAN angle of the moving light 20 stops at a desired angle intended by the operator through the stop of the rough adjustment control. The operator can stop the moving light 20 at a certain angle by performing the same gesture or the predetermined gesture once more. Particularly, the stop at the certain position after the rough adjustment is not disclosed in the related art, and the stop control of the rough adjustment can be performed through the intuitive operation, for example, of performing only the same gesture again. As above, the operator can perform the stop of the fine adjustment, the rough adjustment, and the rough adjustment by flicking the right end surface 134 of the capacitance sensor 130.

Hereinbefore, the description has been given about the pan motion in the CW direction (clockwise rotation direction) of the moving light 20, but the pan motion in the CCW direction (counterclockwise rotation direction) of the moving light 20 also can be similarly performed by flicking the left end surface 135 of the capacitance sensor 130. In addition, as illustrated in the comparison table of FIG. 4, the state of the tilt, the zoom, and the like of the moving light 20 in addition to the pan motion, and further the gradation of the modulated light can be adjusted (controlled) by the tap, the flick, the rotation, and the like on each detection area (see FIG. 3) of the capacitance sensor 130.

As described above, the remote control device 100 includes the capacitance sensor 130 detecting a time-dependent change of the position of the recognition target object, the motion recognition unit 140 recognizing a gesture corresponding to the detected time-dependent change of position of the recognition target object, the control unit 110 generating a control signal based on the gesture, and the two-way wireless communication unit 160 transmitting the control signal to an apparatus. The control unit 110 generates a control signal based on the gesture such that the apparatus performs a fine adjustment control to move a portion by a predetermined movement amount in the preset direction. In addition, the control unit 110 generates a control signal such that the apparatus performs the rough adjustment control to move the portion to the maximum movable range in the preset direction when the same gesture is recognized again within a predetermined time after the recognition of the gesture. Further, when the same gesture or the predetermined gesture is recognized again while the control signal to move the apparatus to the maximum movable range is generated, the control unit 110 generates a control signal such that the apparatus performs the "rough adjustment control stop" of stopping the portion.

With this configuration, the operator can quickly perform the fine adjustment, the rough adjustment, and the stop of the rough adjustment in an intuitive manner through the gesture on the detection area of the capacitance sensor 130. The operability of the remote control device 100 is improved so that the apparatus can be easily adjusted.

FIGS. 8A and 8B are diagrams illustrating the relation between the capacitance sensor 130 of a modification example of the remote control device 100 of the present embodiment, and the gesture corresponding to the subject capacitance sensor 130 by using the correspondence table.

Example 1

The capacitance sensor 130 (see FIG. 1) further detects a distance between the detection surface 130a of the capacitance sensor 130 and the recognition target object. In FIG. 1, the capacitance sensor 130 detects whether the distance in a sheet surface direction (Z-axis direction) in FIG. 1 is a "short distance", a "middle distance", or a "long distance". Incidentally, the "short distance", the "middle distance", and the "long distance" are relatively set in such a manner that a certain distance range is set as the "middle distance", a distance shorter than the middle distance is set as the "short distance", and a distance longer than the middle distance is set as the "long distance". Such a relative distance can be detected based on the magnitude of measurement value of the capacitance sensor 130.

As illustrated in FIG. 8A, the motion recognition unit 140 (see FIG. 2) recognizes the gesture based on the position of the recognition target object and the time-dependent change of the distance between the detection surface 130a of the capacitance sensor 130 and the recognition target object.

For example, the motion recognition unit 140 recognizes a case where the distance between the detection surface of the capacitance sensor 130 and the recognition target object is the "short distance" as a first gesture, recognizes the case of the "middle distance" as a second gesture, and recognizes the case of "long distance" as a third gesture. As above, the different gestures can be assigned to the distances of the recognition target object by detecting the distance of the recognition target object. For example, in FIG. 4, the gesture "tap" on the right end surface 134 of the capacitance sensor 130 indicates that a motion that "the gradation of modulated light is raised by one level" is performed on the moving light 20, but in the modification example, the motion may be assigned to the "double tap", or the "flick" in addition to the "tap" according to the "short distance", the "middle distance", and the "long distance". The distance of the recognition target object of the operator is adjusted in this manner, and thus it is possible to implement the motion of the moving light 20 through various gestures, and to implement an advanced usage method. In addition, since the case of the "short distance" is considered that the operator has a stronger motion intention, the intention may be reflected to the recognition of the gesture. For example, in a case where the position of the recognition target object is the "short distance", the gradation of the modulated light is raised by three levels.

Example 2

The capacitance sensor 130 (see FIG. 1) further detects the speed of the recognition target object. In FIG. 1, the capacitance sensor 130 detects the speed at which the recognition target object moves on the detection area of FIG. 1. For example, the capacitance sensor 130 detects "high", "medium", "low" of the speed of the recognition target object, and the motion recognition unit 140 (see FIG. 2) recognizes the gesture based on "high", "medium", "low" of the speed of the recognition target object as illustrated in FIG. 8A. In this example, a case where the speed of the recognition target object is "high" is recognized as a first gesture, the case of "medium" is recognized as a second gesture, and the case of "low" is recognized as a third gesture. The speed of the recognition target object is detected as above, and thus it is possible to assign the various gestures to the motions of the recognition target object. For example, in FIG. 4, in a case where the rotation speed at which the capacitance sensor 130 is rotated to the central part 131 is high, the PAN angle is raised by three levels.

The modification example 1 and the modification example 2 may be used in combination.

The present invention is not limited to the above-described embodiment, and the present invention may be modified without departing from the spirit of the present invention, for example, as following (a) to (g).

(a) The motor of the control-target apparatus is not particularly limited, and may be arbitrary type, and further the number of the motors also is not limited.

(b) The number of the control-target apparatus is not limited to two or more, and may be one.

(c) The remote control device 100 is not limited to a dedicated remote control device, and may be a smartphone.

(d) A signal between the remote control device 100 and the control-target apparatus may not include an allowance signal, a lock signal, an unlock signal, an OK signal, or the like. The communication between the remote control device 100 and the control-target apparatus is not limited to the two-way communication, and a moving signal may be transmitted through one-way communication such as infrared communication or visible light communication.

(e) The timing when the control unit 110 obtains the detection signal of the capacitance sensor 130 may be a timing after the operation starts. Accordingly, it is possible to further reduce a power consumed by the capacitance sensor 130.

(f) The position of the detection area of the capacitance sensor 130 is not limited to FIG. 3. In addition, the correspondence table between the gesture and the motion of the apparatus is not limited to FIG. 4.

(g) The apparatus operated by the remote control device 100 is not limited to the variable illuminator such as the moving light as long as the portion of the apparatus is drivable.

According to the present invention, the operability of the remote control device is improved and thus the apparatus can be easily adjusted.

What is claimed is:

1. A remote control device comprising:
a detector that detects a time-dependent change of a position of a recognition target object;
a motion recognition unit that recognizes a gesture corresponding to the time-dependent change of the position of the recognition target object detected by the detector;
a controller that generates a control signal based on the gesture recognized by the motion recognition unit; and
a transmitter that transmits the control signal to an apparatus having a drivable portion to command a movement of the drivable portion,
wherein the controller generates a first control signal based on the gesture recognized by the motion recognition unit, the first control signal instructing the apparatus to move the drivable portion by a predetermined movement amount in a preset direction,
wherein the controller generates a second control signal when the same gesture is recognized again by the motion recognition unit within a predetermined time period after the gesture is recognized by the motion recognition unit, the second control signal instructing the apparatus to move the drivable portion to a maximum movable range of the drivable portion in the preset direction.

2. The remote control device according to claim 1, wherein the controller generates a third control signal when the same gesture or a predetermined gesture is recognized again by the motion recognition unit after the second control signal is generated, the third control signal instructing the apparatus to stop moving the drivable portion.

3. The remote control device according to claim 1, wherein the detector is a non-contact or contact position sensor including a capacitance sensor.

4. The remote control device according to claim 1, wherein the detector detects a distance between a detection surface and the recognition target object, and wherein the controller recognizes the gesture based on the distance detected by the detector.

5. The remote control device according to claim 1, wherein the detector detects a speed of movement of the recognition target object, and wherein the controller recognizes the gesture based on the speed of movement of the recognition target object detected by the detector.

6. An apparatus controlling system comprising:
an apparatus having a drivable portion; and
a remote controller for controlling a movement of the drivable portion,
wherein the remote controller includes:
a detector that detects a time-dependent change of a position of a recognition target object;
a motion recognition unit that recognizes a gesture corresponding to the time-dependent change of the position of the recognition target object detected by the detector;

a controller that generates a control signal based on the gesture recognized by the motion recognition unit; and a transmitter that transmits the control signal to the apparatus to command the movement of the drivable portion, wherein the controller generates a first control signal based on the gesture recognized by the motion recognition unit, the first control signal instructing the apparatus to move the drivable portion by a predetermined movement amount in a preset direction, and wherein the controller generates a second control signal when the same gesture is recognized again by the motion recognition unit within a predetermined time period after the gesture is recognized by the motion recognition unit, the second control signal instructing the apparatus to move the drivable portion to a maximum movable range of the drivable portion in the preset direction.

7. The apparatus controlling system according to claim 6, wherein the apparatus is a lighting equipment.

* * * * *